United States Patent
Harris

(10) Patent No.: US 7,697,447 B2
(45) Date of Patent: Apr. 13, 2010

(54) CONTROL OF JITTER BUFFER SIZE AND DEPTH

(75) Inventor: John M. Harris, Chicago, IL (US)

(73) Assignee: Motorola Inc., Schaumburg, IL (US)

( * ) Notice: Subject to any disclaimer, the term of this patent is extended or adjusted under 35 U.S.C. 154(b) by 1668 days.

(21) Appl. No.: 09/973,206

(22) Filed: Oct. 9, 2001

(65) Prior Publication Data

US 2003/0031210 A1 Feb. 13, 2003

Related U.S. Application Data

(60) Provisional application No. 60/311,703, filed on Aug. 10, 2001.

(51) Int. Cl.
*H04L 12/28* (2006.01)
*H04W 4/00* (2009.01)
*H04J 3/06* (2006.01)

(52) U.S. Cl. .................. 370/252; 370/328; 370/516

(58) Field of Classification Search ............. 370/252, 370/328, 329, 516, 229, 310, 338; 710/52
See application file for complete search history.

(56) References Cited

U.S. PATENT DOCUMENTS

| | | | | |
|---|---|---|---|---|
| 5,790,534 A * | 8/1998 | Kokko et al. | ............... | 370/335 |
| 5,825,771 A * | 10/1998 | Cohen et al. | ............... | 370/394 |
| 5,914,950 A * | 6/1999 | Tiedemann et al. | ......... | 370/348 |
| 6,119,235 A * | 9/2000 | Vaid et al. | ..................... | 726/11 |
| 6,249,530 B1 * | 6/2001 | Blanco et al. | ............... | 370/468 |
| 6,298,057 B1 * | 10/2001 | Guy et al. | ................... | 370/389 |
| 6,317,600 B1 * | 11/2001 | Salonaho et al. | ............ | 455/453 |
| 6,330,071 B1 * | 12/2001 | Vidyanand | ................ | 358/1.15 |
| 6,452,950 B1 * | 9/2002 | Ohlsson et al. | ............. | 370/516 |
| 6,504,838 B1 * | 1/2003 | Kwan | ........................ | 370/352 |
| 6,545,989 B1 * | 4/2003 | Butler | ........................ | 370/329 |
| 6,671,512 B2 * | 12/2003 | Laakso | ...................... | 455/453 |
| 6,683,889 B1 * | 1/2004 | Shaffer et al. | .............. | 370/516 |

(Continued)

FOREIGN PATENT DOCUMENTS

WO WO 01/13542 A1 2/2001

OTHER PUBLICATIONS

Mandyman "Power Control Based on Radio Link Protocol in CDMA2000." *IEEE Wireless Communications and Networking Conference*; Sep. 1999, pp. 1368-1372.

(Continued)

*Primary Examiner*—Chi H Pham
*Assistant Examiner*—Warner Wong
(74) *Attorney, Agent, or Firm*—Steven A. May

(57) ABSTRACT

A packet data communication system that includes a mobile station having a jitter buffer and a wireless infrastructure having a base site serving the mobile station controls a size or dept of the jitter buffer. The size or depth is controlled based on a number of retransmissions of erroneously received data employed by the system, a radio frequency load of the base site, and a round trip time period for acknowledgments and corresponding retransmissions. The jitter buffer size may be further controlled by use of a supplemental channel to expedite the transmission of data and thereby fill up the jitter buffer more quickly and by reduction of a waiting period for retransmission of the acknowledgments, thereby reducing the round trip time period.

13 Claims, 9 Drawing Sheets

U.S. PATENT DOCUMENTS

| | | | |
|---|---|---|---|
| 6,757,367 B1* | 6/2004 | Nicol | 379/90.01 |
| 6,859,460 B1* | 2/2005 | Chen | 370/412 |
| 6,895,235 B2* | 5/2005 | Padgett et al. | 455/406 |
| 6,917,607 B1* | 7/2005 | Yeom et al. | 370/342 |
| 6,950,669 B2* | 9/2005 | Simonsson | 455/522 |
| 7,065,051 B2* | 6/2006 | Airy et al. | 370/236 |
| 7,187,666 B1* | 3/2007 | Farley et al. | 370/331 |
| 7,373,151 B1* | 5/2008 | Ahmed | 455/452.2 |
| 2001/0036155 A1* | 11/2001 | Bauer et al. | 370/230 |
| 2002/0154610 A1* | 10/2002 | Tiedemann et al. | 370/329 |
| 2003/0032427 A1* | 2/2003 | Walsh et al. | 455/428 |
| 2003/0072266 A1* | 4/2003 | Uesugi et al. | 370/236 |
| 2003/0123466 A1* | 7/2003 | Somekh et al. | 370/401 |
| 2003/0167170 A1* | 9/2003 | Andrsen et al. | 704/270 |
| 2004/0120309 A1* | 6/2004 | Kurittu et al. | 370/352 |
| 2005/0002411 A1* | 1/2005 | Moataghed | 370/413 |

OTHER PUBLICATIONS

Chockalingam et al. "Performance of TCP/RLP Protocol Stack on Correlated Fading DS-CDMA Wireless Links." *IEEE Vehicular Technology Conference*, May 1998; pp. 363-367.

Khan et al. "Link Layer Buffer Size Distributions for HTTP and FTP Applications in an IS-2000 System." *IEEE 52$^{nd}$ Vehicular Technology Conference*, Fall 2000; vol. 2, Sep. 2000, pp. 955-962.

Harris et al. "Analytical Model for Radion Link Protocol for IS-95 CDMA Systems." *IEEE 51$^{st}$ Vehicular Technology Conference Proceedings*; vol. 3, May 2000, pp. 2434-2438.

Tachikawa et al. "ARQ Protocols for Bi-Directional Data Transmission." *Information networking*, 1998 (*ICOIN-12*) *Proceedings, Twelfth International Conference*; 1998, pp. 468-473.

* cited by examiner

CONTROL OF JITTER BUFFER SIZE AND DEPTH

CROSS-REFERENCE TO RELATED APPLICATION

This application is based on prior U.S. Patent Application No. 60/311,703, filed Aug. 10, 2001, and priority thereto is hereby claimed.

FIELD OF THE INVENTION

The present invention relates generally to wireless packet data communication systems, and, in particular, to the use of jitter buffers in a wireless packet data communication system.

BACKGROUND OF THE INVENTION

Wireless packet data communication systems are well known and consist of many types, including land mobile radio, cellular radiotelephone, and personal communication systems. With each communication system, data is transmitted between a transmitting communication device and a receiving communication device via a communication resource that includes a communication channel that operates over a physical resource, typically a frequency bandwidth.

In a typical packet data communication system, information is transmitted in data packets, or data frames. In a transmitting communication device, a lengthy data stream is typically subdivided into multiple data blocks. Each data block is then wrapped with a header to form a data packet. Included in the header for each data packet is a sequence number corresponding to the position of the data block in the data stream. The sequence numbers allow a receiving communication device to receive the multiple data packets comprising the multiple data blocks in any order and to reassemble the original data stream.

The receiving communication device stores the received data blocks in a jitter buffer, where the data blocks are reordered in their proper sequence and stored. The jitter buffer stores a predetermined amount of data and, when full, conveys the stored data to a user of the receiving communication device, that is, a listener, via a user interface.

In a typical Radio Link Protocol (RLP) wireless communication system, erroneously received data packets are acknowledged by transmission of a NAK message by the receiving communication device. The NAK message includes an identifier of the erroneously received data packet. The transmitted data packets are stored in a memory of the transmitting communication device. When the transmitting communication device receives the NAK message, the transmitting communication device retransmits the identified data packet.

By storing data in a jitter buffer from the initiation of a spoken message, gaps in voice may be avoided, which gaps result from the retransmission of erroneously received data. For example, the data stream conveyed from the transmitting communication device to the receiving communication device may be an audio message "Do not place the order." If the data packets corresponding to the word "not" are erroneously received, the data in those packets would not be conveyed to the listener in the absence of a retransmission. The received message might then be conveyed as "Do place the order," with a gap appearing in place of the word "not." Therefore, jitter buffers are used to store all data received after the erroneously received data packet, pending retransmission of the erroneous packet. When the retransmitted packet is received, the packet is inserted into its proper position among the stored data and the data is played out to the listener. The jitter buffer typically is of a sufficient size that the jitter buffer can store all data received subsequent to the erroneously received data until the erroneously received data is acknowledged, retransmitted, and properly inserted into the data stored in the buffer.

Although the use of the jitter buffer improves the reliability of a data communication by providing for the retransmission of erroneously received data, the use of the jitter buffer also produces a delay in the set up of a dispatch communication. In order to prevent a gap from appearing at some point in a voice communication due to the acknowledgment and retransmission of erroneously received packets, the receiving communication device does not initially convey a voice communication to the listener until the jitter buffer is full. By imposing a system delay at the start of the conversation, erroneously received data may be retransmitted and inserted in already received data without creating a subsequent voice gap when a later erroneous packet is received and subsequently received data must be stored.

For a communication system that employs a single acknowledgment and retransmission, the jitter buffer-related delay may be 200 ms or more. This delay is in addition to other call set up delays between the moment that a user of the transmitting communication device, that is, a speaker, initiates a call, such as by pressing a push-to-talk (PTT) button on a keypad of the device, to the moment that an audio message input by the speaker into the transmitting communication device is conveyed to the listener at the receiving communication device. Similarly, a jitter buffer delay resulting from a filling of a jitter buffer in a receiving communication device occurs each time there is a change in who is speaking in the dispatch communication.

Any delay in call set up is undesirable, as is any delay in the time that it takes an audio message spoken into a transmitting communication device to be conveyed to a listener at a receiving communication device. Therefore a need exists for a method and an apparatus for reducing jitter buffer delay.

DETAILED DESCRIPTION OF THE INVENTION

Figure 1:
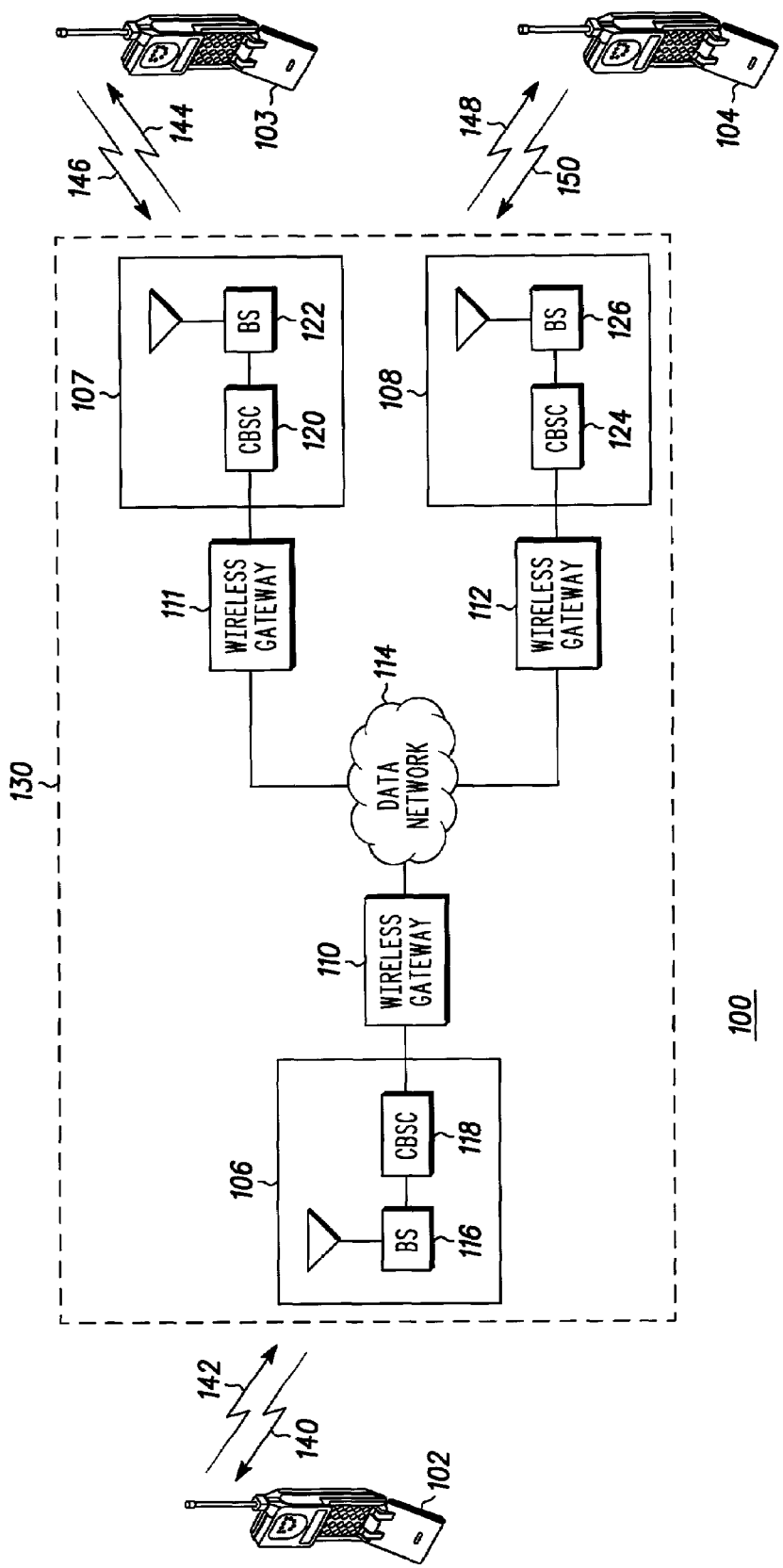
FIG. 1 is a block diagram of a wireless packet data communication system in accordance with an embodiment of the present invention.

To address the need for a method for reducing delay in a packet data communication system, a packet data communication system is provided that reduces delay in a transmission of data packets by controlling a size or depth of a jitter buffer. The communication system includes a mobile station having the jitter buffer and a wireless infrastructure having a base site serving the mobile station. The size or depth of the jitter buffer is controlled based on based on a number of retransmissions of erroneously received data employed by the system, a radio frequency load of the base site, and a round trip time period for acknowledgments and corresponding retransmissions. The jitter buffer size may be further controlled by use of a supplemental channel to expedite the transmission of data and thereby fill up the jitter buffer more quickly and by reducing the waiting period for retransmission of the acknowledgments, thereby reducing the round trip time period.

Generally, an embodiment of the present invention encompasses a method for determining a jitter buffer depth target. The method comprises steps of determining a radio frequency (RF) load metric corresponding to a base site, comparing the determined RF load metric to an RF load threshold to produce a comparison, and determining a jitter buffer depth target based on the comparison.

Another embodiment of the present invention encompasses a method for conveying data from a transmitting communication device to a receiving communication device in a packet data communication system, wherein the transmitting communication device and the receiving communication device are each in wireless communication with a wireless infrastructure. The method includes steps of establishing a reverse link between the transmitting communication device and the wireless infrastructure, establishing a forward link between the wireless infrastructure and the receiving communication device, wherein the reverse link is established prior to the establishment of the forward link, and signaling a user of the transmitting communication device to begin transmitting data prior to the establishment of the forward link.

Still another embodiment of the present invention encompasses a method for determining a size of a jitter buffer including steps of determining a number of retransmissions permitted of an erroneously received frame and determining a size of the jitter buffer based on the determined number of permitted retransmissions.

Yet another embodiment of the present invention encompasses a method for reducing system delay in a wireless packet data communication system that includes multiple forward links and multiple reverse links, wherein each forward link of the multiple forward links and each reverse link of the multiple reverse links comprises multiple traffic channels and a supplemental channel. The method includes steps of building a radio frequency (RF) link in a reverse link assigned to a first mobile station as part of a set up of a dispatch call involving a plurality of mobile stations and assigning a supplemental channel in at least one of the plurality of reverse links and plurality of forward links to the dispatch call. The method further includes a step of transmitting frames over the assigned supplemental channel and until jitter buffers of each of the non-speaker mobile stations participating in the call are filled when there is a switch in who is speaking in the dispatch call.

Still another embodiment of the present invention encompasses a method for constraining a size of a jitter buffer. The method comprises steps of erroneously receiving a frame and acknowledging the erroneously received frame and counting down a holdoff time period, wherein the holdoff time period is a period of time that expires while the listener MS awaits a retransmission of the erroneously received frame. When the holdoff time period expires without the receiving a retransmission of the acknowledged frame, the acknowledgment is retransmitted, and when the erroneously received frame is a retransmitted frame or a non-audio information frame, a length of the holdoff time period is reduced.

The present invention may be more fully described with reference to FIGS. 1-9. FIG. 1 is a block diagram of a wireless packet data communication system 100 in accordance with an embodiment of the present invention. Communication system 100 includes multiple mobile stations (MS's) 102-104 (three shown), such as cellular telephones or radiotelephones. Each MS 102-104 is serviced by one of multiple radio access networks (RAN) 106-108 (three shown), and in particular by a respective base site 116, 122, 126 included in the RAN. Each base site 116, 122, 126 includes at least one base transceiver station (BTS) (not shown).

Each base site 116, 122, 126 provides wireless communication services to the mobile units in the base site's coverage area. That is, base site 116 provides communications services to MS 102, base site 122 provides communications services to MS 103, and base site 126 provides communications services to MS 104. Each RAN 106-108 further includes a respective centralized base station controller (CBSC) 118, 120, 124 in communication with the respective base site 116, 122, 126. Each RAN 106-108 is in communication with a respective Wireless Gateway 110-112, which Wireless Gateways are each in turn in communication with a data network 114, such as the Internet. Together, RAN's 106-108, Wireless Gateways 110-112, and data network 114 are collectively referred to herein as a fixed infrastructure 130.

Each of RAN's 106-108 provides wireless voice and data communication services to the mobile stations in the RAN's coverage area and may do so in accordance with virtually any wireless communication protocol. Preferably, communication system 100 is a Code Division Multiple Access (CDMA) communication system that operates in accordance with the TIA/EIA (Telecommunications Industry Association/Electronic Industries Association) IS-2000 standard, hereby incorporated herein, which provides a compatability standard for IS-2000 communication systems, and each of RAN's 106-108 is an IS-2000 access network. However, those who are of ordinary skill in the art realize that communication system 100 may utilize any one of multiple communication protocols, such as Time Division Multiple Access (TDMA), Global System for Mobile communications (GSM), or Orthogonal Frequency Division Multiplexing (OFDM).

Each of base sites 116, 122, and 126 wirelessly communicates with the MS's in the base site's coverage area via a forward link and a reverse link. As depicted in FIG. 1, RAN 106 wirelessly communicates with MS 102 via forward link 140 and a reverse link 142, RAN 107 wirelessly communicates with MS 103 via forward link 144 and a reverse link 146, and RAN 108 wirelessly communicates with MS 104 via forward link 148 and a reverse link 150. Each of forward links 140, 144, and 148 and reverse links 142, 146, and 150 includes multiple communication channels. Typically, the multiple communication channels of each link include a pilot channel, a supplemental channel, multiple paging channels, and multiple traffic, or bearer, channels. Preferably, communication system 100 preferably is a Code Division Multiple Access (CDMA) communication system in which a communication channel comprises an orthogonal code that is used to cover transmitted data; however, in alternative embodiments system 100 may be a Time Division Multiple Access (TDMA) or Global System for Mobile communication (GSM) communication system in which a communication channel comprises a time slot or a Frequency Division Multiple Access (FDMA) or Orthogonal Frequency Division Multiple Access (OFDM) communication system in which a communication channel comprises a frequency bandwidth.

Figure 2:
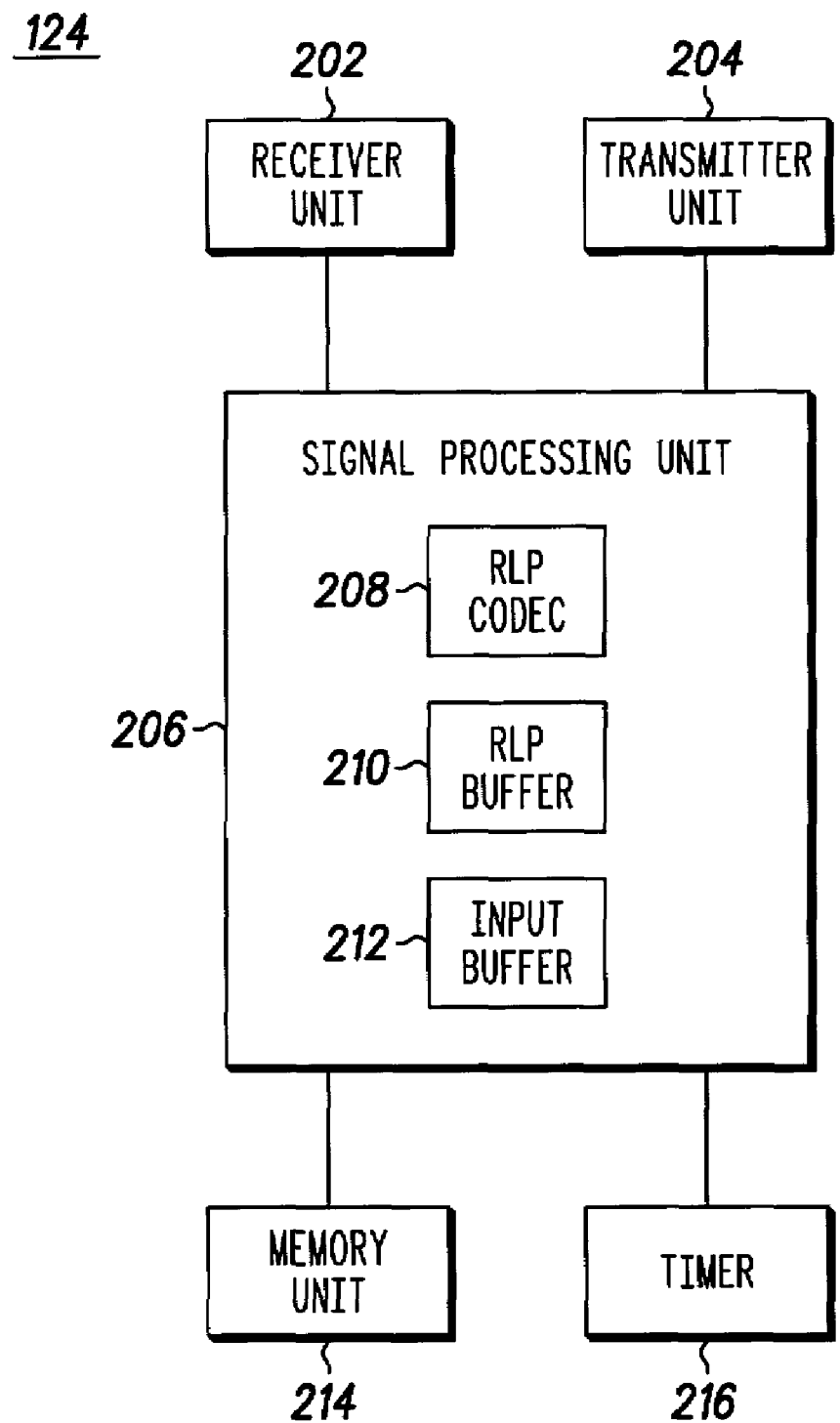
FIG. 2 is a functional block diagram of an infrastructure of FIG. 1 in accordance with an embodiment of the present invention.

FIG. 2 is a functional block diagram of fixed infrastructure 130 in accordance with an embodiment of the present invention. Infrastructure 130 includes a receiver unit 202 and a transmitter unit 204 that are each in communication with a signal processing unit 206. The functions of signal processing unit 206 may be performed by one or more microprocessors or a digital signal processors (DSP's). Signal processing unit 206 includes a radio link protocol (RLP) coder/decoder (codec) 208 that decodes data received via receiver unit 202 and that encodes data for transmission via transmitter 204. Signal processing unit 206 further includes an RLP buffer 210, preferably a resequencing, or jitter, buffer, and an input buffer, 212; however, in another embodiment of the present invention, each of RLP buffer 210 and input buffer 212 may be included in a memory unit 214 associated with signal processing unit 206.

Figure 3:
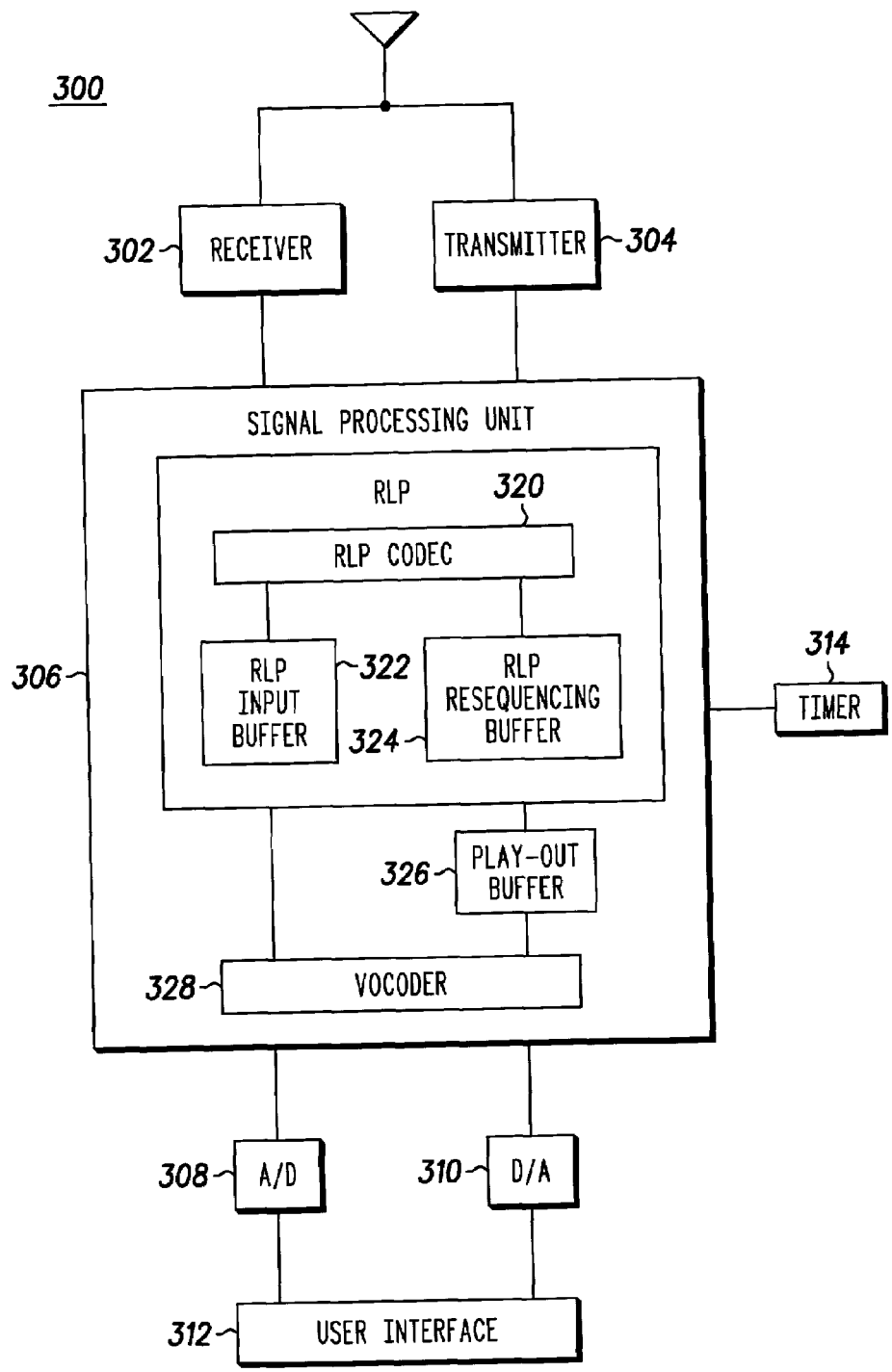
FIG. 3 is a block diagram of a mobile communication device of FIG. 1 in accordance with an embodiment of the present invention.

FIG. 3 is a block diagram of a mobile station 300, such as MS's 102-104, in accordance with an embodiment of the present invention. Mobile station 300 includes a receiver 302 and a transmitter 304 that are each in communication with a signal processing unit 306, such as a microprocessor or a digital signal processor (DSP). Signal processing unit 306 executes multiple applications, such as vocoder 328, and programs that are stored in the signal processing unit or in an associated memory and that permit the functioning of mobile station 300. Signal processing unit 306, or alternatively the memory associated with the signal processing unit, further includes an RLP input buffer 322 that stores RLP frames for subsequent transmission via transmitter 304, an RLP resequencing, or jitter, buffer 324 that stores RLP frames received via receiver 302, and a play-out buffer 326 that stores vocoder frames derived from the RLP frames stored in RLP jitter buffer 324. Mobile station 300 further includes an analog-to-digital converter (A/D) 308 and a digital-to-analog converter (D/A) 310 in communication with signal processing unit 306 and a user interface 312 in communication with each of A/D 308 and D/A 310. User interface 312 provides an interface with a user of mobile station 300 whereby the user may input information into the mobile station or receive information output by the mobile station.

When a user of a mobile station, such as MS 102, wishes to initiate a dispatch communication with one or more target mobile stations who are members of the same dispatch group, such as MS's 103, 104, the user depresses a push-to-talk (PTT) key included in user interface 312. Depression of the PTT key causes MS 102 to transmit a dispatch request over a channel in reverse link 142, preferably an access channel (ACH). The dispatch request includes an identifier uniquely associated with MS 102.

Upon receiving the dispatch request, infrastructure 130, preferably RAN 106, assigns MS 102 use of a traffic, or bearer, channel in each of forward link 140 and reverse link 142 and sets up traffic channels, or speaker radio frequency (RF) links (i.e., a speaker reverse RF link in reverse link 142 and a speaker forward RF link in forward link 140) between MS 102 and infrastructure 130 by well known channel assignment and call set up techniques. After the speaker RF links are built and infrastructure 124 receives a response to a paging message from MS 104 verifying an availability of MS 104, RAN 106 conveys a message to MS 102 on the reverse link traffic channel indicating that the MS can play a talk permit tone (TPT), such as a beep, informing the user of MS 102 that he or she may begin speaking into MS 102. Preferably, this message is sent via CDMA signaling. MS 102 then plays the TPT.

Besides setting up the speaker RF links, upon receiving the dispatch request infrastructure 130, via RAN's 107 and 108, also transmits a paging message to each of MS's 103 and 104 over a paging channel in each of forward links 144 and 148. In response to receiving the paging message, each of MS's 103 and 104 engages in an exchange of CDMA signaling messages with respective RAN's 107 and 108 in order to set up a traffic, or bearer, channels (i.e., listener forward RF links) in respective forward links 144 and 148 and traffic, or bearer, channels (i.e., listener reverse RF links) in respective reverse links 146 and 150. The listener RF links provide an over-the-air link by which each RAN 107, 108 may transmit RLP frames to respective MS's 103 and 104. By building the speaker reverse RF link in reverse link 142 and a listener forward RF link in each of forward links 144 and 148, an overall forward link is established between MS 102 and each of MS 103 and MS 104, wherein each overall forward link comprises two RF legs or links, that is, a speaker reverse RF link and a listener forward RF link.

The process of setting up the speaker reverse RF link typically begins prior to the transmission of the paging messages to MS's 103 and 104. As a result, set up of the speaker reverse RF link is typically completed prior to the completion of the set up of either listener forward RF link. In the prior art, the user of MS 102, that is, the speaker, is not permitted to begin speaking until the listener forward RF links are completed. The amount of time elapsing between completion of the speaker reverse RF link and completion of the listener forward RF links could be 400 ms or more. In the prior art, it can take 500 ms or longer to fill the RLP jitter buffer 326 in each of MS's 103 and 104 before the MS begins playing out voice.

Communication system 100 permits the speaker to begin speaking upon completion of the speaker RF links. When the TPT is played, the user of MS 102 may begin speaking. When the user of MS 102 begins speaking into the MS, the audio information is digitized by A/D 308 to produce digital data. MS 102 routes the digital data to signal processing unit 306 of MS 102, which routes the digital data to vocoder 328. Vocoder 328 compresses the digital data pursuant to any one of numerous well known voice compression algorithms to produce multiple vocoded frames. Preferably each vocoded frame is either 99 bits in length, with a vocoded frame generated every 45 ms, or is 128 bits in length, with a vocoded frame generated every 30 ms. Each vocoded frame is then sent to RLP input buffer 322, where the frame may be combined with other vocoded frames output by vocoder 328 and is wrapped with an RLP header to produce an RLP frame. MS 102 then transmits the RLP frame to RAN 106 via codec 320, transmitter 304 and the speaker reverse RF link set up in reverse link 142.

Figure 4:
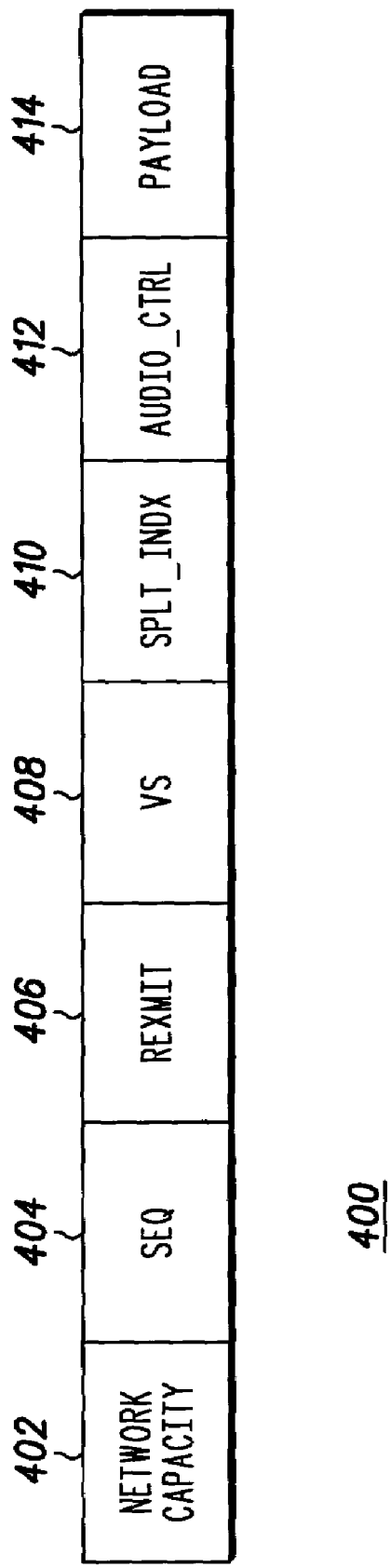
FIG. 4 is a block diagram of an RLP frame in accordance with an embodiment of the present invention.

FIG. 4 is a block diagram of an RLP frame 400 in accordance with an embodiment of the present invention. RLP frame 400 includes a payload 414 comprising one or more vocoder frames and further includes a header comprising data fields 402-412. A network capacity data field 402 provides an indication of the capacity that the network is operating at. Preferably this data field indicates whether the network is operating at above or below a predefined threshold. A sequence (SEQ) data field 404 contains the least significant bits of the data frames sequence number. The sequence number corresponds to a position, in time, of the RLP frame relative to other RLP frames generated by the MS as part of an audio communication. The sequence number allows a receiving communication device to receive the RLP frames in any order and then to reorder the frames in the order in which the frames were generated. When an RLP frame is retransmitted, the SEQ value of the original RLP frame is maintained. A retransmitted frame data field (REXMIT) 406 is set to '1' when the frame is retransmitted data frame and otherwise is set to '0'. A vocoded frame data field (VS) 408 indicates the number of vocoded frames included in the RLP frame, and a split index data field (SPLT_INDX) 410 indicates whether any vocoded frames had to be split among multiple RLP frames. An audio play-out control data field (AUDIO_CTRL) 412 indicates whether the audio receiver should begin play-out of any received codec samples. This field is set to '1' to indicate play-out should begin and '0' to indicate play-out should not begin and buffering should take place.

The RLP frames conveyed by MS 102 to infrastructure 130 during set up of the listener RF links are transmitted at a first speaker link power level that is sufficiently high, and a corresponding frame error rate (FER) target that is sufficiently low, that retransmissions of erroneously received RLP frames are not required. As a result, RLP frames that are erroneously received by infrastructure 130 during the time period that the listener speaker link is being built are erased or dropped and there are no retransmissions of the erased or dropped frames.

The RLP frames sent to infrastructure 130 during the build up of the listener RF links are stored in RLP buffer 210 in infrastructure 130 and conveyed by the infrastructure to MS 104 immediately upon completion of the listener RF links. In another embodiment of the present invention, when the depth of RLP buffer 210 is less than the required depth of the play-out buffers 326 of MS's 103 and 104, infrastructure 130 determines a difference between the depth of buffer 210 and the required depth of the play-out buffers. Infrastructure 130 then waits a time period approximately equal to the determined difference before conveying the frames stored in RLP buffer 210 to MS's 103 and 104. Similar to the transmission of RLP frames over the speaker reverse RF link during set up of the listener RF links, the RLP frames conveyed by infrastructure 130 to each of MS's 103 and 104 upon completion of the set up of the listener RF links, or alternatively after waiting a time period corresponding to the determined difference in buffer depths, are transmitted at first listener link power levels that are sufficient high, and at corresponding frame error rate (FER) targets that are sufficiently low, that retransmissions of erroneously received RLP frames are not required. As a result, RLP frames that are erroneously received by either MS 103 or MS 104 during this time period are erased or dropped and there are no retransmissions of the erased or dropped frames.

As is well known in the art, higher transmitted signal power levels correspond to lower FER's. For example, and merely for the purpose of illustrating the principles of the present invention, suppose that a minimum tolerable FER for voice communications is 1 percent (%) and that there is a zero (0) percent NAK erasure rate. Without retransmission of erroneously received frames, the FER target should be set at, at most, 1%. However, if one retransmission is permitted and an FER of 1% is desired, then the FER target may be set at 10%. By setting the FER target at 10%, approximately 10% of the originally transmitted RLP frames are erroneously received and then approximately 10% of the retransmitted RLP frames are erroneously received, for an overall error rate of 10%× 10%=1% (i.e., 0.10×0.10=0.01). By using retransmissions and targeting a higher FER (i.e., 10%), the RLP frames may be transmitted at a lower power level since a greater number of errors in the transmission are acceptable.

When each of MS's 103 and 104 receives the RLP frames that were stored in infrastructure 130 while the listener RF links were being set up, the MS routes each frame to signal processing unit 306 included in the MS. Incorrectly received RLP frames are erased or dropped and there are no retransmissions of the erased or dropped frames. Signal processing unit 306 routes each RLP frame to codec 320, which decodes the frame and routes the decoded frame to RLP jitter buffer 324. Signal processing unit 306 also performs an error check on each RLP frame to determine whether the frame was correctly received and determines an error metric that measures an error rate for the received signal. For example, the error metric may be an FER or a bit error rate (BER) that is determined for the received frames, or may be a signal-to-noise ratio (SNR), a carrier-to-interference ratio (CIR), or an $E_b/I_o$ ratio (energy per bit/interference power density (per Hertz)) that is determined for a received signal and respectively compared to an SNR, CIR, or $E_b/I_o$ threshold.

For each of MS's 103 and 104, correctly received RLP frames are stored in RLP jitter buffer 324 of the MS, where the frames are reordered based on the sequencing (SEQ) number included in the RLP header of each frame. Signal processing unit 306 of the MS extracts the transmitted vocoded frames, in frames' sequential order, from the reordered frames stored in RLP jitter buffer 324. Signal processing unit 306 then routes the vocoded frames from the MS jitter buffer 324 to the MS vocoder 328, bypassing the MS play-out buffer 326. Vocoder 328 decompresses the vocoded frames and plays the decompressed frames out to the user of the MS via the MS's D/A 310 and user interface 312.

Due to voice compression by vocoder 328 in MS 102 and voice decompression by vocoder 328 in each of MS 103 and MS 104, audio information is received by MS 103 and MS 104 more quickly than the MS can play it out. As a result, when infrastructure 130 initially downloads RLP frames to MS's 103 and 104, communication system 100 fills the jitter buffers 324 in each MS while the MS is playing out audio information. For example, assuming that the vocoder 328 in MS 102 is a 4 times the rate vocoder and that approximately 100 ms of silence occurs after the TPT before the speaker begins speaking, it can take only 100 ms for MS 102 to send RLP frames corresponding to 500 ms of audio play out by MS 104. If play-out buffer 326 in each of MS's 103 and 104 each have a size of 500 ms, then enough audio information can be conveyed to each of MS's 103 and 104 in 200 ms to provide audio play-out for a time equivalent to the depth of their play-out buffers.

After the jitter buffers 324 in MS's 103 and 104 are filled, acknowledgments and retransmissions are instituted in communication system 100. Since the jitter buffers are is filled, an acknowledgment and a retransmission of an RLP frame erroneously received by infrastructure 130 or MS 104 will not create a gap in the play out of audio information. Furthermore, since acknowledgments and a retransmissions are being used, a higher FER target is then established for the overall links between MS 102 and MS 103 and between MS 102 and MS 104, and RLP frames are transmitted at lower power levels. By transmitting RLP frames at lower power levels, RF interference with other communications sharing the same bandwidth or adjacent bandwidths is minimized.

After the jitter buffers 324 in MS's 103 and 104 are filled, MS 102 conveys RLP frames to infrastructure 130 at a second speaker link power level that is lower than the first speaker link power level. Infrastructure 130 forwards these frames to each of MS's 103 and 104 at second listener link power levels that are lower than the respective first listener link power levels. Higher FER targets are also set for the transmissions of frames between MS 102 and infrastructure 130 and between infrastructure 130 and MS's 103 and 104 upon initiation of the retransmission of erroneously received frames.

When an RLP frame is erroneously received by infrastructure 130 after completion of the set up of the listener RF links, the infrastructure erases, or drops, the erroneously received frame, stores subsequently received RLP frames in RLP buffer 210, and acknowledges (i.e., sends a NAK) the erroneously received frame to MS 102. In response to receiving the NAK, MS 102 retransmits the acknowledged frame. When infrastructure 130 correctly receives a retransmitted frame, the retransmitted frame is added to the buffered frames and the buffered frames are transmitted to MS's 103 and 104. When, after a predetermined number of acknowledgements and retransmissions, the frame has not yet been correctly received, the frame is aborted and the buffered frames are transmitted to MS's 103 and 104. Similarly, frames incorrectly received by either MS 103 or MS 104 are acknowledged by the respective MS (by transmitting a NAK to infrastructure 130 and retransmitted by the infrastructure. When, after a predetermined number of acknowledgements and retransmissions, the frame has not yet been correctly received by the MS, the frame is aborted.

The process described above for expediting the play out of audio information to listeners in a dispatch communication is also applicable to a change in who is speaking in a dispatch communication. Similar to the initiation of a dispatch communication, a listener using a mobile station involved in a dispatch communication, such as a user of MS 103, who wishes to speak may reserve a traffic channel in a reverse link, such as reverse link 146, by depressing the PTT key on the user's MS. Speaker RF links are then established for use by the user of MS 103 in reverse link 146 and forward link 144 and listener RF links are established for the user of MS 102 in forward link 140 and reverse link 142. Alternatively, MS 102 and MS 104 may maintain their already established RF links. The jitter buffers 324 of MS 102 and MS 104 are then reset and the above described process may then be used to expedite the play out of audio information from the user of MS 103 to the users of MS 102 and 104.

The RLP frames received by each of MS's 103 and 104 subsequent to the completion of the listener RF links are stored in RLP jitter buffer 324, reordered based on the sequencing (SEQ) number, stored in play-out buffer 326, and then played out to the user of the MS. In order to avoid any gaps in the play-out of audio information by either MS 103 or MS 104, the jitter buffer 324 in each of MS 103 and 104 should be of sufficient size to permit storage of all RLP frames received between the time that an RLP frame is erroneously received by one or more of MS's 103 and 104 and the receipt of a correctly retransmitted frame or the aborting of the frame, whichever shall last occur. An abort simply indicates that system 100 has given up on attempting to transmit that particular frame. An abort is well defined in the IS-707 standard, which standard is promulgated by the TIA/EIA and is hereby incorporated herein. Each buffer should also be of sufficient size or depth that each listening MS is playing out audio information at approximately the same time, avoiding gaps that may result from one MS requesting a retransmission of a frame that is correctly received by another MS.

Figure 5:
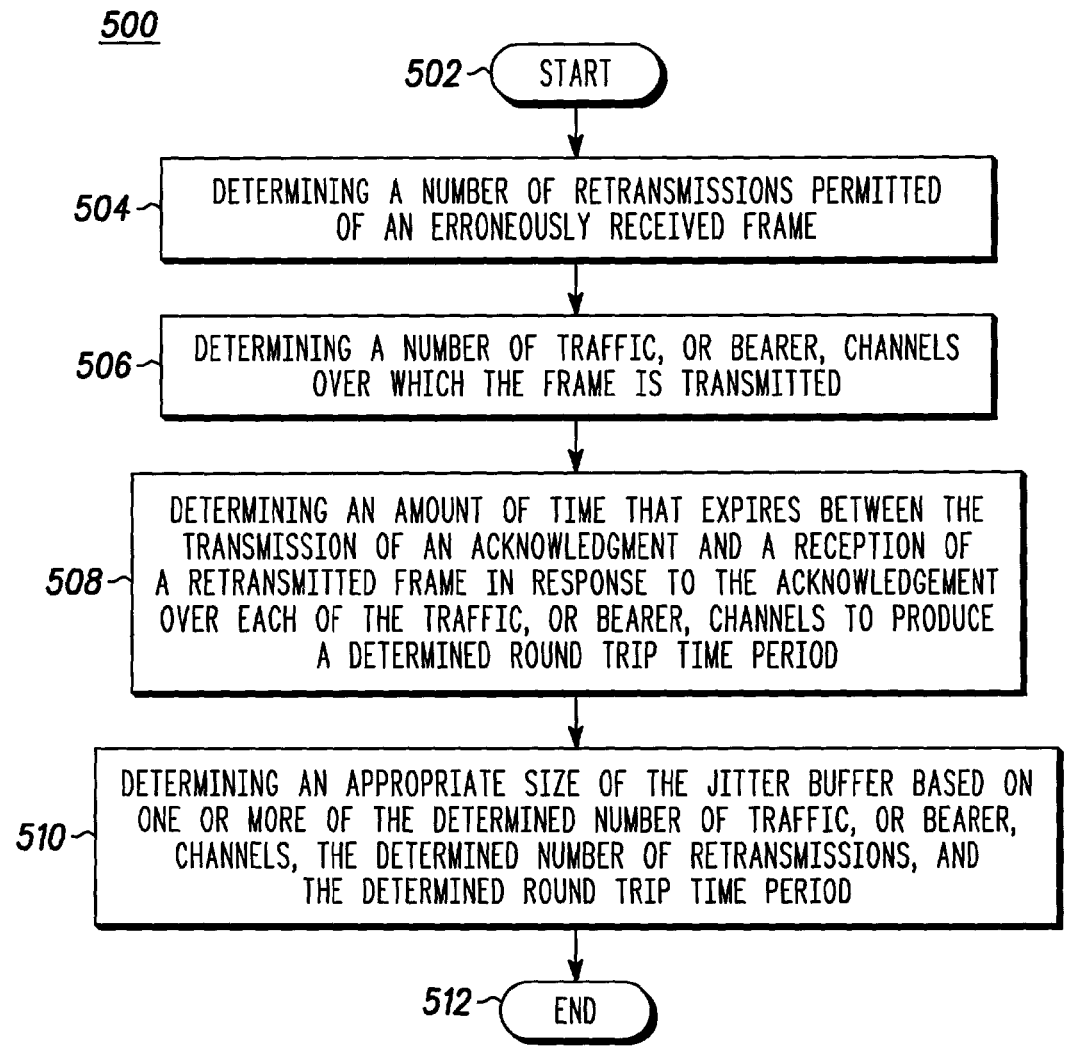
FIG. 5 is a logic flow diagram of steps executed by a communication system to determine a size or depth of a jitter buffer in accordance with an embodiment of the present invention.

FIG. 5 is a logic flow diagram 500 of steps executed by communication system 100, and preferably infrastructure 130, in determining a size or depth of jitter buffer 324 in accordance with an embodiment of the present invention.

Logic flow diagram 400 begins (502) when infrastructure 130 determines (504) a number of retransmissions permitted of an erroneously received RLP frame. Infrastructure 130 further determines (506) a number of traffic, or bearer, channels over which the RLP frame is being transmitted, and determines (508) an amount of time that expires between the transmission of a NAK and a reception of a retransmitted frame in response to the NAK over each of the traffic, or bearer, channels to produce a round trip time period. Infrastructure 130 then determines (510) an appropriate size of jitter buffer 324 based on one or more of the determined number of traffic channels, preferably the number of listener RF links, set up for the dispatch call, the determined number of retransmissions of an erroneously receive RLP frame, and the determined round trip time period, and the logic flow ends (512).

In one embodiment of the present invention, the round nip time period may be based on the CDMA signaling during the set up of the call. In another embodiment of the present invention, a round trip time period may be determined based on the propagation time of signals transmitted by infrastructure 130 to an MS 103, 104 and known signal processing times in infrastructure 130 and MS's 102-104. Each base site 116, 122, 126 is synchronized with the other base sites in system 100 by reference to a GPS (Global Positioning Satellites) system or by reference to a common time synchronization unit (not shown) that provides a common timing reference to each base site. In turn, each of MS's 102-104 is synchronized with base sites 116, 122, 126 by reference to the GPS system or by synchronization signals transmitted to the MS by infrastructure 130. Since RLP frames are typically transmitted in 20 ms time slots in a CDMA system, the MS's can determine the propagation delay of a frame based on a known transmission time of the frame, that is, a start of the 20 ms time period, and a time of receipt of the frame.

Figure 6:
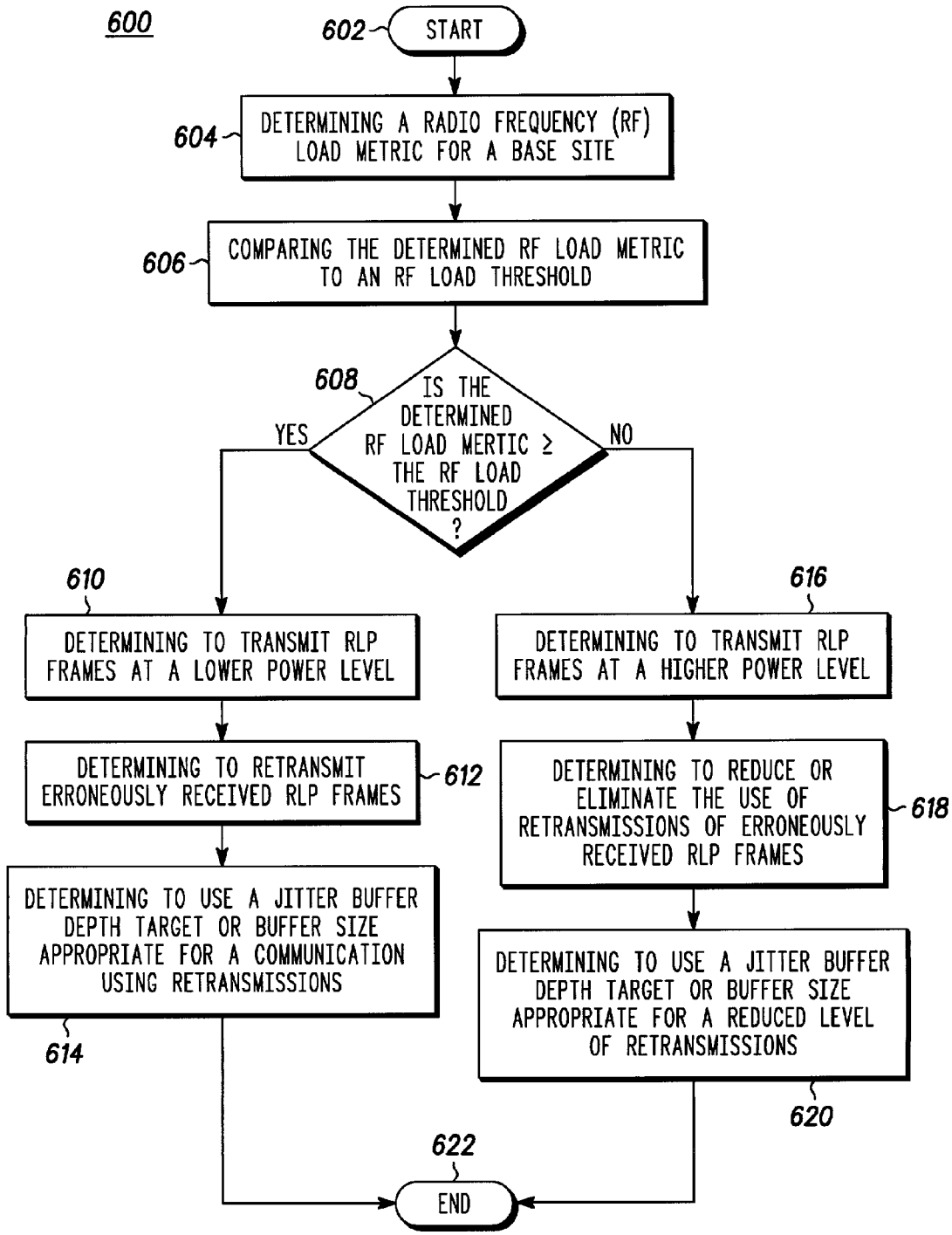
FIG. 6 is a logic flow diagram of the steps executed by a communication system to adjust a size or depth of a jitter buffer in accordance with another embodiment of the present invention.

In yet another embodiment of the present invention, a "dynamic adjustment embodiment," the size or depth of jitter buffer 324 in each of MS 103 and 104 may be dynamically adjusted based on a percentage of all existing traffic, or bearer, channels available at the MS's respective servicing base site 122, 126 that are engaged in active communications, or further engaged in active communications and using retransmissions. FIG. 6 is a logic flow diagram 600 of the steps executed by system 100, preferably infrastructure 130, in adjusting a size or depth of jitter buffer 324 in accordance with the dynamic adjustment embodiment of the present invention. In the dynamic adjustment embodiment, a depth, or size, of jitter buffer 324 may be predetermined or may be determined as described above at the initiation of a dispatch call.

Logic flow diagram 600 begins (602) when infrastructure 130 determines (604) a radio frequency (RF) load metric corresponding to a base site (e.g., base sites 122, 126). In one embodiment of the present invention, the RF load metric corresponds to a percentage of existing bearer channels at the base site that are engaged in active communications. Alternatively, or in addition thereto, the RF load metric may further consider a percentage of existing bearer channels at the base site that are engaged in active communications and are using retransmissions of erroneously received RLP frames. Infrastructure 130 then compares (606) the determined RF load metric to an RF load threshold. Preferably the RF load threshold is predetermined value that is stored in the infrastructure.

When infrastructure 130 determines (608) that the RF load metric is greater than or equal to the RF load threshold, infrastructure 130 determines (610) to transmit RLP frames at a lower power level. Infrastructure 130 further determines (612) to retransmit erroneously received RLP frames, and determines (614) to use a jitter buffer depth target or buffer size appropriate for a communication using retransmissions, and the logic flow ends (622). The buffer depth target is approximately the amount of time that expires between a time that MS 104 first transmits an acknowledgment of an erroneously received frame and a time that the MS either correctly receives a retransmitted frame, after a predetermined maximum number of retransmissions, or aborts the frame, which ever shall last occur, plus a little slack to compensate for variations in system 100 performance. Of course, when there are no retransmissions, the buffer depth target may be greatly reduced to a nearly negligible depth.

When infrastructure 130 determines (608) that the RF load metric is less than the RF load threshold, infrastructure 130 determines (616) to transmit at a higher power level, which power level is sufficiently high to be able to reduce the need for retransmissions of erroneously transmitted frames or to be able to acheive a desired FER without the use of retransmissions. Infrastructure 130 also further determines (618) to reduce or eliminate the use retransmissions of erroneously transmitted frames, and determines (620) to use a jitter buffer depth target or buffer size appropriate for a reduced level of retransmissions, such as reducing a maximum number of retransmissions from two to one, or appropriate for communication not using any retransmissions, which may result in a nearly negligble buffer depth target. Infrastructure 130 then conveys the determined jitter buffer depth to the MS serviced by the base site and the logic flow ends (622).

Every time the speaker and listener change roles, the jitter buffer 324 in the new listener MS must be refilled. As detailed above, the filling of a jitter buffer consumes time and creates delays. In order to save time and reduce the delays in conveying audio information from the new speaker to the new listener, the process detailed above for playing out audio information while jitter buffers are filled during the set up of a call is repeated. That is, when the speaker and listener initially change roles, RLP frames are conveyed from the new speaker (e.g., MS 104) to the new listener (e.g., MS 102) over each RF link between the new speaker and the new listener at an increased power level and/or a reduced FER, without acknowledgments and retransmissions, and without buffering in infrastructure 130 or in the listener's MS for a predetermined period of time. The predetermined period of time is at least long enough to permit a conveyance of a number of RLP frames from the speaker to the listener whose play-out, by the listener's MS, will last long enough to permit the jitter buffer 324 and play-out buffer 326 of the listener's MS to be filled. After the expiration of the predetermined period of time, RLP frames subsequently transmitted from the new speaker to the new listener are transmitted over each RF link between the two at a lower power level and/or higher FER, with acknowledgments and retransmissions, and with buffering in the listener MS's jitter buffer 324.

Figure 7:
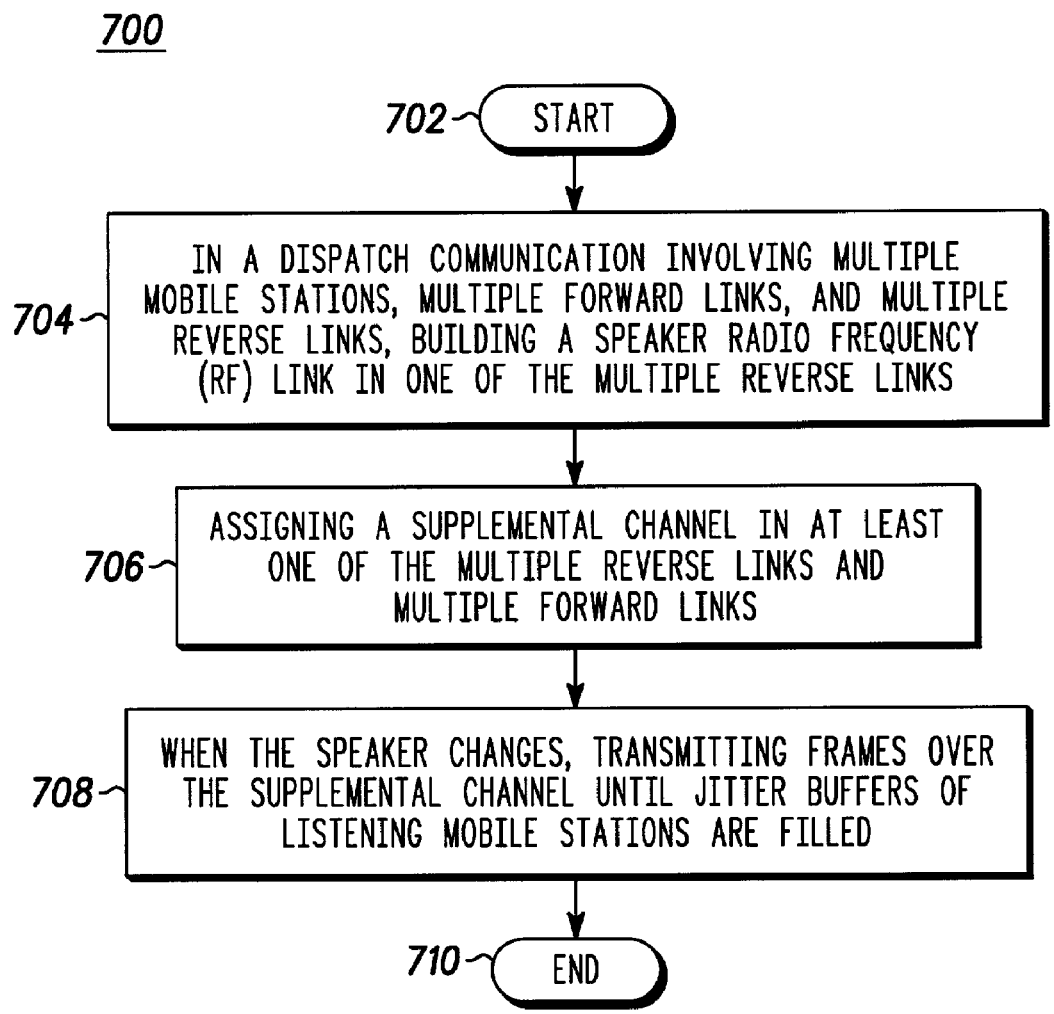
FIG. 7 is a logic flow diagram of the steps executed by a communication system to reduce system delay in accordance with yet another embodiment of the present invention.

FIG. 7 is a logic flow diagram 700 of the steps executed by system 100, preferably infrastructure 130, in reducing system delay in accordance with yet another embodiment of the present invention. Logic flow diagram 700 begins (702) when infrastructure 130 builds (704) the speaker RF links. In addition to building the speaker and listener RF links, infrastructure 130 assigns (706) a supplemental channel in at least one of reverse links 142, 146 and 150 and forward links 140, 144, and 148 to the communication between the speaker and listener. RLP frames are then transmitted (708) between the speaker and the listener over the assigned supplemental channel(s) when there is a switch in speaker and until the jitter buffers 324 of the other MS's participating in the call are filled. The logic flow then ends (710). The supplemental channel transmits data to the jitter buffers 324 more quickly that the play-out buffers can play out stored audio information, thereby expediting the filling up of the jitter buffers 324 while the play-out buffers 326 are playing out audio data to the listener and reducing the likelihood of a gap in the audio transmission due to an incompletely filled jitter buffer 324 awaiting a retransmitted frame while the play-out buffer 326 lacks data to play out. Furthermore, an expedited filling up of the jitter buffers 324 facilitates an earlier play out of audio information when the call is initiated or there is a switch in who is speaking.

Figure 8:
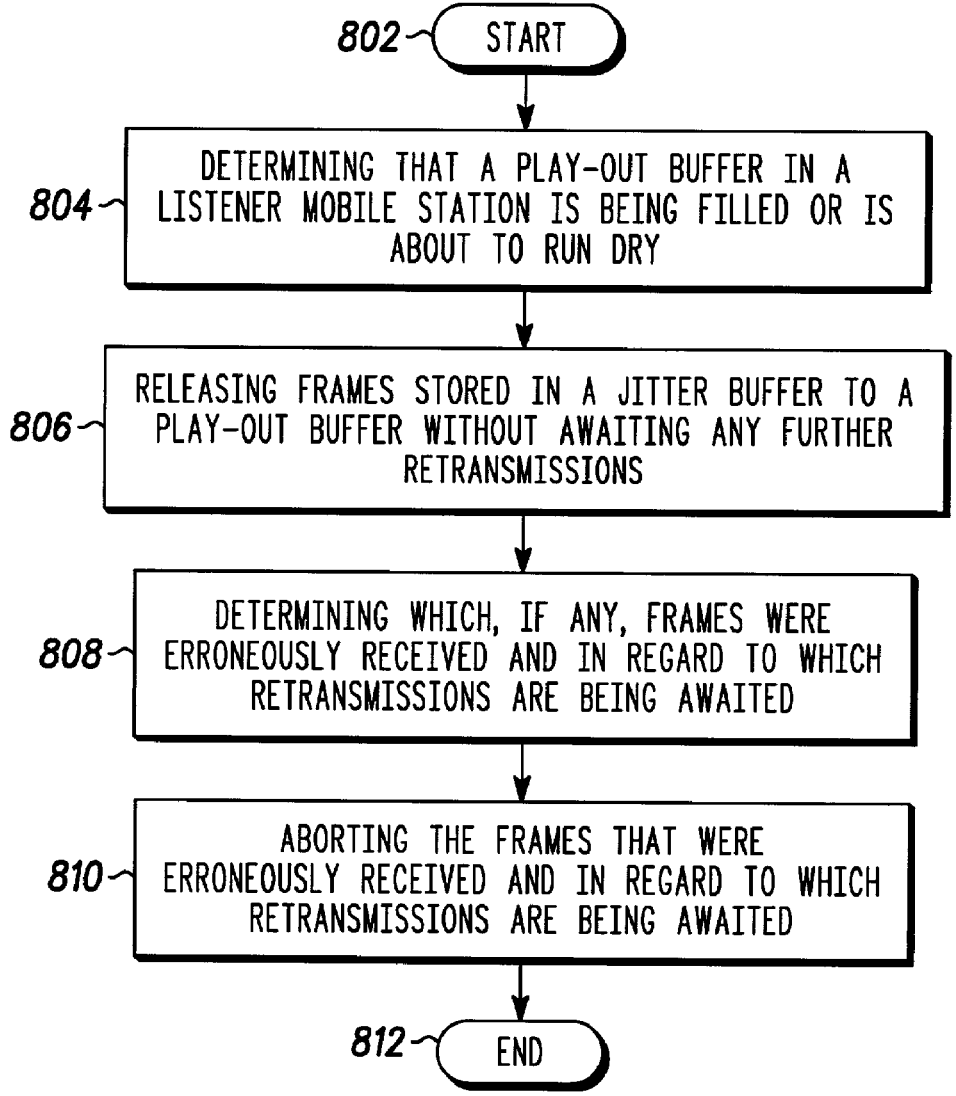
FIG. 8 is a logic flow diagram of the steps executed by a listener mobile station to reduce system delay in accordance with another embodiment of the present invention.

FIG. 8 is a logic flow diagram 800 of the steps executed by a listener MS, such as MS's 103 or 104, in reducing system delay in accordance with still another embodiment of the present invention. The logic flow begins (802) when signal processing unit 306 of a listener MS determines (804) that a play-out buffer 326 in the listener MS is being filled or is about to run dry. For example, while play-out buffer 326 is playing out the audio information stored in the buffer, jitter buffer 324 may be storing frames while awaiting a retransmission of one or more erroneously received frames. As a result, data is being output from play-out buffer while no data is being input and the buffer is starting to run dry. In response to determining that play-out buffer 326 is being filled or is about to run dry, signal processing unit 306 releases (806) frames stored in jitter buffer 324 to play-out buffer 326 without any further waiting for the retransmission. Signal processing unit 306 also forces an abort of an erroneously received frame that is awaiting a retransmission, by determining (808) which, if any, of frames have been erroneously received and in regard to which the jitter buffer is awaiting retransmissions and aborting (810), those frames. The logic flow then ends (812). By releasing the frames that are stored in jitter buffer 324 prior to receiving a retransmission, a potential gap in the play out of audio information to the listener may be avoided.

Figure 9:
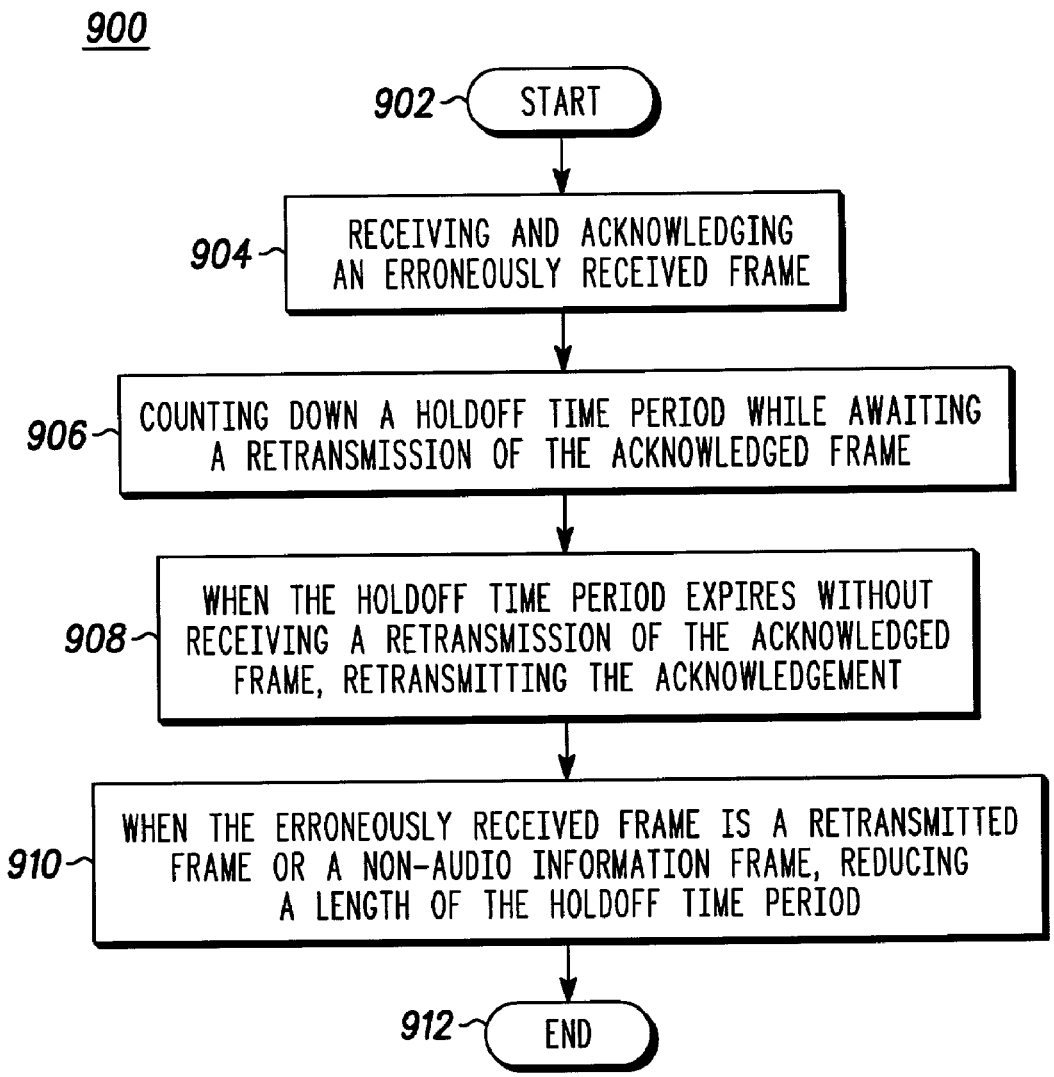
FIG. 9 is a logic flow diagram of the steps executed by a listener mobile station to constrain a buffer size in accordance with another embodiment of the present invention.

In still another embodiment of the present invention, a size of jitter buffer 324 in receiving communication device, such as listener MS's 103 or 104 with respect to RLP frames transmitted by infrastructure 130 or respective base sites 122, 126 with respect to RLP frames transmitted by MS 102, may be constrained. FIG. 9 is a logic flow diagram 900 of the steps executed by a listener MS, such as MS's 103 or 104, in constraining a buffer size in accordance with another embodiment of the present invention. Logic flow 900 begins (902) when an RLP frame is erroneously received and acknowledged (904) by an MS. Upon acknowledging the frame, signal processing unit 306 of the listener MS counts down (906) a holdoff time period, that is, a period of time that expires while the listener MS awaits a retransmission of the erroneously received frame. When a holdoff period is included in the acknowledgment and retransmission cycle of system 100, the holdoff period is a factor in the length of the round trip time for the acknowledgment of an erroneously received frame and a retransmission of the acknowledged frame. As a result, the holdoff period is a factor in the desired size of the jitter buffer and the jitter buffer depth target.

Preferably the holdoff period of time counted down by signal processing unit 306 with reference to timer 314. Also, preferably the holdoff period of time is predetermined time period that can be adjusted as detailed below in step 910; however the holdoff time period may be determined based on propagation delays in the RF links and known signal processing delays in infrastructure 130 and the MS's 102-104.

When the holdoff time period expires without the MS receiving a retransmission of the acknowledged frame, signal processing unit 306 retransmits (908) the NAK. When the erroneously received frame is a retransmitted frame or a non-audio information frame, such as a DTX frame, the signal processing unit (910) reduces a length of the holdoff time period, and the logic flow ends (912). By reducing the holdoff time period, a round trip time period is reduced, which round trip corresponds to a transmission of a NAK by the receiving communication device and a receipt of a retransmitted frame in response to the NAK. By reducing the round trip time period, the size of the jitter buffer may be reduced since the size of the buffer is dependent upon the length of time required to receive a correctly retransmitted frame after receiving an erroneous frame.

In sum, a packet data communication system is provided that controls a size or depth of the jitter buffer. The communication system includes a mobile station having a jitter buffer and a wireless infrastructure having a base site serving the mobile station controls a size or depth of the jitter buffer. The size or depth of the jitter buffer is controlled based on based on a number of retransmissions of erroneously received data employed by the system, a radio frequency load of the base site, and a round trip time period for acknowledgments and corresponding retransmissions. The jitter buffer size may be further controlled by use of a supplemental channel to expedite the transmission of data to the jitter buffer. The supplemental channel transmits data to a jitter buffer more quickly that an associated play-out buffer can play out stored audio information, thereby expediting the filling up of the jitter buffer while the play-out buffer plays out audio data to the listener. This reduces the likelihood of a gap in the audio transmission due to an incompletely filled jitter buffer awaiting a retransmitted frame while the play-out buffer 326 lacks data to play out. Furthermore, an expedited filling up of the jitter buffers 324 facilitates an earlier play out of audio information when the call is initiated or there is a switch in who is speaking. The size of the jitter buffer may be further controlled by reducing the waiting period for retransmission of acknowledgments when an acknowledgment is transmitted and no corresponding retransmitted frame is received. By reducing the waiting period, the round trip time period for acknowledgments and corresponding retransmissions is reduced, thereby reducing a target size or depth of the jitter buffer.

While the present invention has been particularly shown and described with reference to particular embodiments thereof, it will be understood by those skilled in the art that various changes may be made and equivalents substituted for elements thereof without departing from the spirit and scope of the invention. In addition, many modifications may be made to adapt a particular situation or material to the teachings of the invention without departing from the essential scope thereof. Therefore, it is intended that the invention not be limited to the particular embodiments disclosed herein, but that the invention will include all embodiments falling within the scope of the appended claims.

What is claimed is:

1. A method for determining a jitter buffer depth target comprising steps of:
    determining, by a wireless infrastructure, a radio frequency (RF) load metric corresponding to a base site;
    comparing, by the wireless infrastructure, the determined RF load metric to an RF load threshold to produce a comparison; and
    determining, by the wireless infrastructure, a jitter buffer depth target of a receiving mobile station based on the comparison.

2. The method of claim 1, wherein when the determined radio frequency (RF) load metric is greater than the RF load threshold, a jitter buffer depth target is used that is appropriate for a communication using retransmissions.

3. The method of claim 2, wherein determining a radio frequency (RF) load metric comprises determining an RF load and wherein the method further comprises a step of determining to transmit frames at a lower power level when the determined RF load is greater than the RF load threshold.

4. The method of claim 2, wherein determining a radio frequency (RF) load metric comprises determining an RF load and wherein the method further comprises a step of determining to retransmit erroneously received frames when the determined RF load is greater than the RF load threshold.

5. The method of claim 1, wherein when the determined radio frequency (RF) load metric is less than the RF load threshold, a jitter buffer depth target is used that is appropriate for a communication using a reduced number of retransmissions.

6. The method of claim 5, wherein determining a radio frequency (RF) load metric comprises determining an RF load and wherein the method further comprises a step of determining to transmit frames at a higher power level when the determined RF load is less than the RF load threshold.

7. The method of claim 5, wherein determining a radio frequency (RF) load metric comprises determining an RF load and wherein the method further comprises a step of determining to reduce a use of retransmissions of erroneously received frames when the determined RF load is less than the RF load threshold.

8. The method of claim 3, further comprising a step of determining to retransmit erroneously received frames when the determined radio frequency (RF) load is greater than the RF load threshold.

9. The method of claim 6, further comprising a step of determining to reduce a use of retransmissions of erroneously received frames when the determined radio frequency (RF) load is less than the RF load threshold.

10. The method of claim 3, wherein determining a radio frequency (RF) load comprises a determination of bearer channels at a base site that are engaged in active communications.

11. The method of claim 3, wherein determining a radio frequency (RF) load comprises a determination of bearer channels at a base site that are engaged in active communications and that are employing retransmissions of erroneously received radio link protocol frames.

12. The method of claim 6, wherein determining a radio frequency (RF) load comprises a determination of bearer channels at a base site that are engaged in active communications.

13. The method of claim 6, wherein determining a radio frequency (RF) load comprises a determination of bearer channels at a base site that are engaged in active communications and that are employing retransmissions of erroneously received radio link protocol frames.

* * * * *